E. F. FRENCH.
Corn Husker.
No. 17,269.
Patented May 12, 1857.
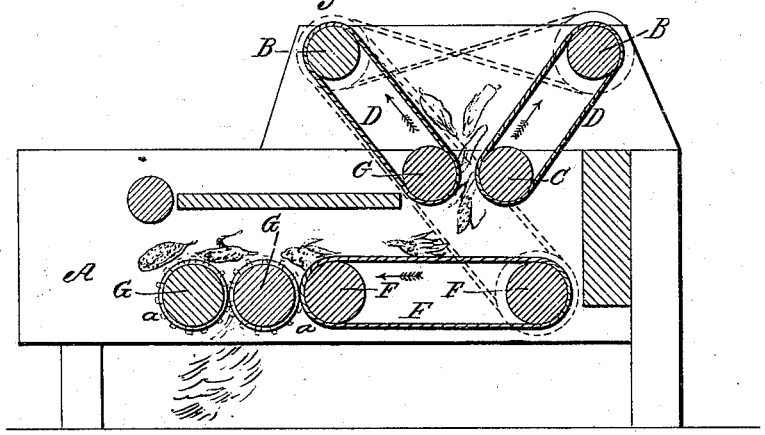
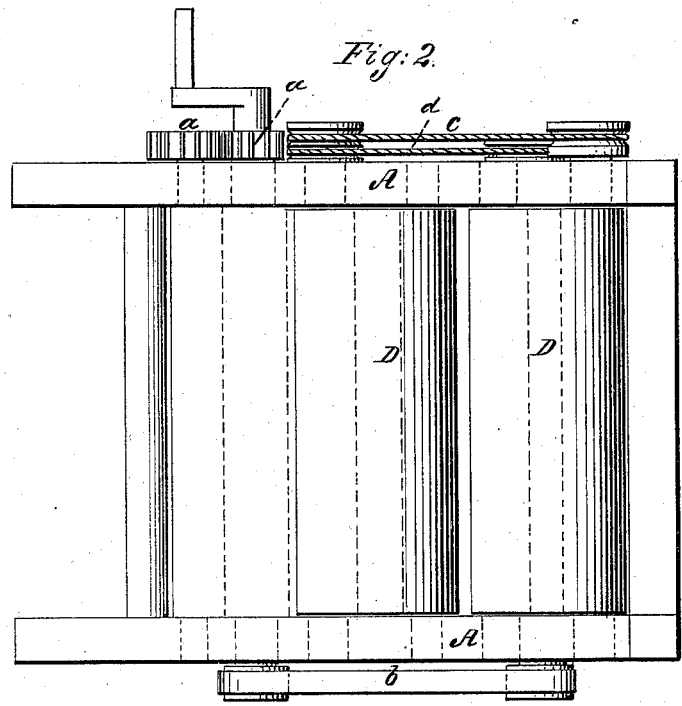

UNITED STATES PATENT OFFICE.

E. F. FRENCH, OF FRANKLIN, VERMONT.

CORN-HUSKER.

Specification of Letters Patent No. 17,269, dated May 12, 1857.

*To all whom it may concern:*

Be it known that I, E. F. FRENCH, of Franklin, in the county of Franklin and State of Vermont, have invented a new and Improved Machine for Husking Corn; and I do hereby declare that the following is a full, clear, and exact description of the same, reference being had to the annexed drawings, making a part of this specification, in which—

Figure 1 is a longitudinal vertical section of my improvement, the plane of section passing through the center. Fig. 2 is a plan or top view of ditto.

Similar letters of reference indicate corresponding parts in the two figures.

To enable those skilled in the art to fully understand and construct my invention I will proceed to describe it.

A, A, represent two side pieces or strips between which the working parts are placed.

B, B, represent two rollers placed transversely between the upper part of the side pieces, and C, C, are two rollers placed between the side pieces some distance below the rollers B, B, and nearer together than the rollers B, B.

D, D, are two endless aprons which pass around the rollers B, C, as shown clearly in Fig. 1.

E is an endless apron placed horizontally between the two side pieces A, A. This apron works over rollers F, F, the apron being below the rollers C, C.

G, G, represent two rollers placed transversely between the two strips A, A, and at the outer end of the apron E. These rollers are covered with india rubber or other suitable elastic material and are placed side by side, the surfaces of the two rollers being in contact. The rollers G, G, have toothed wheels (a) (a) at one end. Said wheels gear into each other, and the power is applied to one of these rollers. A band (b), see Fig. 2, passes around a pulley at the end of one of the rollers G and around a pulley on the outermost roller F of the apron E. One end of the rollers B, B, have a band (c) passing around them and a band (d) passes around one end of said roller F and around the end of one of the rollers B.

When power is applied to one of the rollers G, the aprons D, D, E, and rollers G, G, move as indicated by the red arrows. The cam is placed between the two aprons D, D, which form a hopper, and, in consequence of moving as indicated, have a tendency to loosen the husks on the ears. The ears pass down upon the apron E and are conveyed by said apron to the rollers G, G, which grasp the husks and strip them from the ears, the husks passing between the rollers and the corn passing over them, see Fig. 1, in which the ears of corn and husks are shown in red. The ears cannot pass between the rollers G as they are fitted in permanent bearings, and the elastic covering allows the thin husks to pass between them.

The above machine has been practically tested and operates rapidly and well. It may be cheaply constructed. There are no parts liable to get out of repair, and the husks are discharged from the machine in good condition, or unbroken so that they will answer when slit for upholstery purposes.

Having thus described my invention, what I claim as new, and desire to secure by Letters Patent, is—

The combination of the endless aprons D, D, E, and rollers G, G, two or more, covered with india rubber, or other elastic material, the above parts being arranged and operating as shown and described for the purpose specified.

E. F. FRENCH.

Witnesses:
  H. TEMPLE,
  D. E. SHATTUCK.